United States Patent
Doubts, Jr.

(10) Patent No.: US 6,263,610 B1
(45) Date of Patent: Jul. 24, 2001

(54) FISHING REEL COVER

(76) Inventor: James L. Doubts, Jr., 2918 University Dr., Durham, NC (US) 27707

( * ) Notice: Subject to any disclaimer, the term of this patent is extended or adjusted under 35 U.S.C. 154(b) by 0 days.

(21) Appl. No.: 09/371,235

(22) Filed: Aug. 10, 1999

Related U.S. Application Data

(60) Provisional application No. 60/095,898, filed on Aug. 10, 1998.

(51) Int. Cl.[7] .................................................. A01K 97/08
(52) U.S. Cl. ........................................................... 43/26
(58) Field of Search ........................... 43/25, 26, 21.2; 383/74

(56) References Cited

U.S. PATENT DOCUMENTS

| | | | |
|---|---|---|---|
| D. 264,772 | 6/1982 | Motsko | D3/260 |
| D. 340,576 | 10/1993 | Delagarza et al. | D3/260 |
| 4,136,478 | 1/1979 | Wycosky | 43/26 |
| 4,222,193 | 9/1980 | Beck | 43/26 |
| 4,641,454 | 2/1987 | Ray et al. | 43/26 |
| 4,876,819 | 10/1989 | Clifford | 43/26 |
| 4,916,852 | 4/1990 | Zebleckis | 43/26 |
| 5,050,999 * | 9/1991 | Van Loon, III | 383/74 |
| 5,293,711 | 3/1994 | Robinson | 43/26 |
| 5,501,029 | 3/1996 | McDaniel, Sr. | 43/26 |
| 5,699,632 * | 12/1997 | Stout et al. | 43/25 |
| 6,085,695 * | 7/2000 | Miller et al. | 43/26 |

* cited by examiner

*Primary Examiner*—Darren W. Ark
(74) *Attorney, Agent, or Firm*—Mills Law Firm PLLC

(57) ABSTRACT

A protective covering for a fishing reel and attached rod segment which consists of a cylindrical sleeve made of single-layer waterproof fabric to which drawstrings, provided with a spring-actuated locking devices, are attached on both ends. The device is slid up over the base of the rod, up over the reel, at which point the drawstrings are pulled tight to completed enclose the reel. The cover can also be used in pouch form to protect various and sundry items by pulling both drawstrings tightly closed with such drawstrings being used as handles.

5 Claims, 2 Drawing Sheets

FISHING REEL COVER

CROSS-REFERENCE TO RELATED APPLICATION

This Application claims the benefit under 37 U.S.C. 119(e) of U.S. Provisional Application No. 60/095,898 filed on Aug. 10, 1998 by James L. Doubts, Jr. for FISHING REEL COVER.

BACKGROUND OF INVENTION

1. Field of Invention

The present invention relates generally to protective covers and more particularly jackets for fishing reels that can also be used as a sundry pouch.

The avid fisherman often maintains numerous rods and reels in a ready-to-use condition. Such fishing rods with reel and tackle mounted are often inserted into a rod holder on a vehicle or boat for transport to the fishing site. Because such fishing reels are often exposed to the elements when in transport, they are susceptible to damage by flying debris, sand, moisture, UV light, etc.

There are many items in addition to fishing rods that need to be protected from the elements when not in use. These include, but are not limited to, depth sounders, Loran and GPS navigational equipment, radar, boat winches and the like. Additionally, there are always items that need to be carried or stored that don't need to go in tackle boxes. These include, without limitation, spools of fishing line, rigged leaders on holders, etc.

Although protective covers for rod-mounted reels are known in the art, they have various shortcomings. For example, U.S. Pat. No. 4,876,819 discloses a fishing reel protector having a plurality of pockets and a flexible connecting member extending between the pockets. However, this device is merely wrapped about the fishing rod after the reel has been disposed within one of the pockets and in at least one embodiment, a portion of the reel exposed to the elements.

Similarly, U.S. Pat. No. 4,136,478 discloses a reel cover which covers the reel as well as the handle of the fishing pole. However, this device is unsatisfactory for use when the handle is to be disposed within a rod holder during transport.

Other prior art has shown shortcomings in the ability to cover very large reels or the ease to which the open ends of the cover can be secured around the attached reel and pole.

Also, the prior art covers cannot be drawn tightly together on the end forming a pouch with the drawstrings being used as handles.

2. Concise Explanation of Prior Art

U.S. Design Pat. No. 264,772 to James C. Motsko discloses an ornamental design for a fishing reel pouch to which a fishing reel may be placed inside.

U.S. Design Pat. No. 340,576 to Susan E. Delagarza and Raymond O. Delagarza discloses an ornamental design for a protective cover for a fishing reel, consisting of a fish-shaped bag that covers a fishing reel and the handle of a fishing pole and draws close at the top end of the bag.

U.S. Pat. No. 4,136,478 to Charles J. Wycosky discloses a cover for a fishing reel which encloses the fishing reel, as well as the fishing pole handle, and draws close at the top of the cover.

U.S. Pat. No. 4,222,193 to Ronald A. Beck discloses a tubular case made of braided or pseudo-braided plastic filaments of an open, expandable weave, to which a fishing rod is inserted in one end and forced into the sleeve so that the sleeve expands to conform generally to the shape of the rod and its protuberances.

U.S. Pat. No. 4,641,454 to Douglas M. Ray and Richard H. Weihl discloses a protective sock for a fishing reel that fits over the segmented rod section and attached reel and may be closed at both ends by a closure of the hook-and-loop variety.

U.S. Pat. No. 4,876,819 to James R. Clifford discloses a fishing reel protector consisting of various pockets with elastic banding to facilitate securement of the protector to various parts of the reel.

U.S. Pat. No. 4,916,852 to Richard Zebleckis discloses a protective cover for a fishing rod to which a conformable, expandable, elongated and woven plastic sleeve having an open end and a closed end is placed over a fishing rod. The holder may then be hung up by using the formed eyelet on the closed end of the cover.

U.S. Pat. No. 5,293,711 to David A. Robinson discloses an elongated flexible tube having an entrance opening to cover a fishing rod and attached appurtenances. The cover may be placed over the rod and secured on the open end with an attached drawstring.

Finally, U.S. Pat. No. 5,501,029 to Cecil G. McDaniel, Sr., assignees Tim McDaniel and Robert D. Willis discloses a fishing reel cover to which one end of the reel cover attaches to the reel and the other end of the reel cover is wrapped around the reel spool and is secured back to the first end through the use of hook-and-loop fasteners or the like.

SUMMARY OF THE INVENTION

After much research and study of the above described problems, the present invention has been developed to provide a combination reel cover or jacket and sundries pouch that can be attached over a rod handle and attached reel allowing the cover to provide a simple yet effective means for protecting a rod-mounted reel from exposure to the weather, UV radiation, and other contaminants. Additionally, other equipment as well as sundries from these items can be protected using the present invention in its pouch form.

The present invention is essentially a cylindrical sleeve, consisting of a one-layer waterproof material to which drawstrings, provided with a spring-actuated locking device, are attached on both ends.

To use the present invention as a reel cover, one would slide the device over the base of the rod, up over the reel. At this point the reel is enclosed, with a drawstring above and below the reel and the drawstrings are pulled tight with the lockable devices and closure around the reel is maintained. The present invention can also be used as a cover for spare reels as well as used as a cover for any other items that need protecting, whether mounted or unmounted.

In view of the above, it is an object of the present invention to provide a neat, quick mounting, readily removable cover for reels mounted on rods.

Another object of the present invention is to provide a simple to construct and use dust and spray cover for sundry of mounted equipment.

Another object of the present invention is to provide a flexible, single layer water resistant pouch for carrying and storage of a sundry loose items.

Another object of the present invention is to provide a reel cover that can be used interchangeably on vehicle mounted surf rods and rods mounted in rod holders on fishing vessels.

Another object of the present invention is to provide a protective jacket that can be readily removed just before the item or items being protected are used.

Other objects and advantages of the present invention will become apparent and obvious from a study of the following description and the accompanying drawings which are merely illustrative of such invention.

DETAILED DESCRIPTION OF PREFERRED EMBODIMENT

Figure 1:
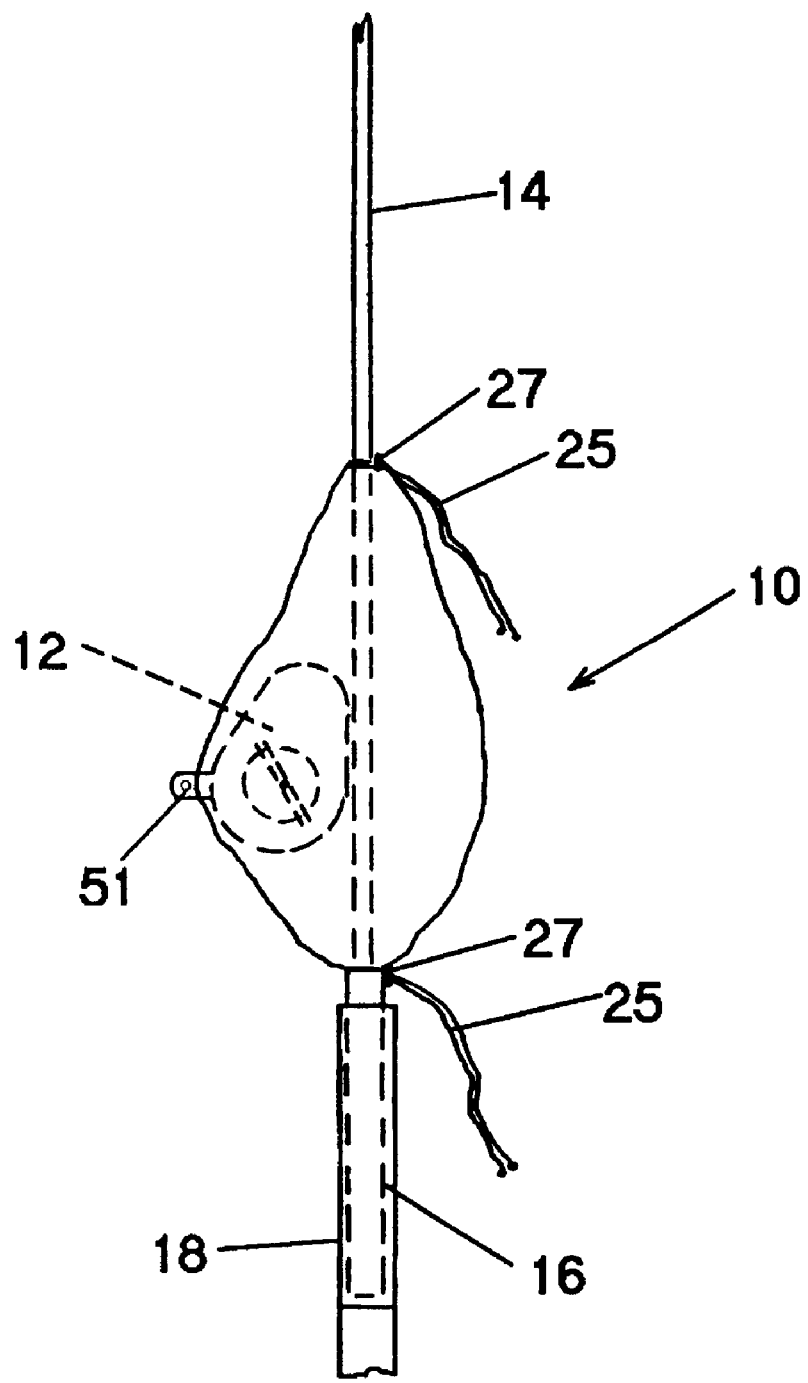
FIG. 1 is a side view of the fishing reel cover showing the placement of the cover over the rod and reel section and depicting the drawstring closures at either end of the cover.

With reference to the drawings, a protective jacket for a rod-mounted fishing reels is indicated generally at 10. The cover 10 is illustrated in its functional position covering a fishing reel 12 installed on a fishing rod 14 including a hand grip portion 16, which in turn is installed in a rod holder 18.

Figure 2:
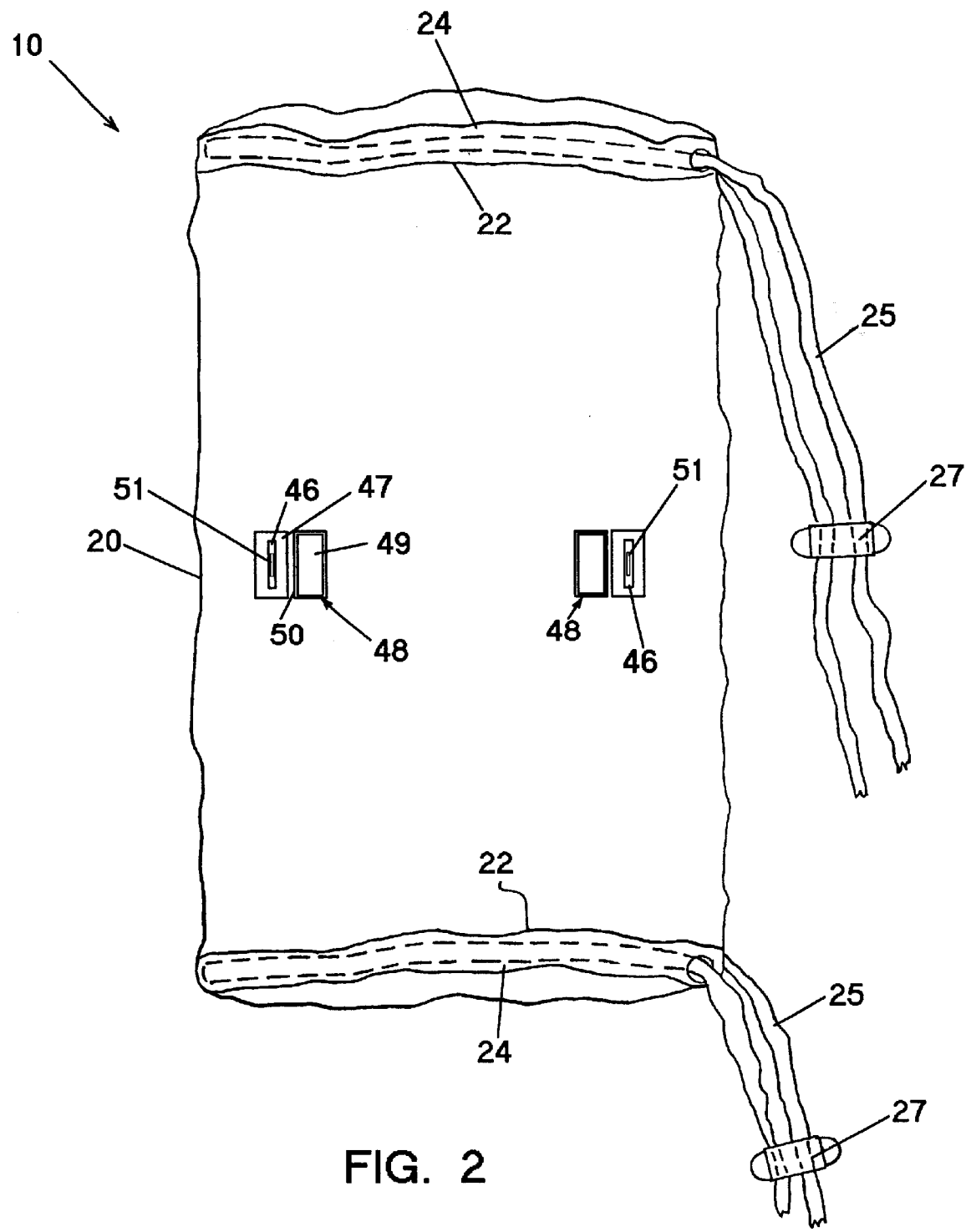
FIG. 2 is an enlarged view of the fishing reel cover depicting the construction of the cover and the drawstring closures.

In the preferred embodiment, the cover 10 is generally constructed as a cylindrical sleeve 20 as shown in FIG. 2 from a breathable, water resistant material such as nylon, dacron or other suitable material.

In the preferred embodiment, the sleeve 20 is fabricated by folding a rectangular piece of the waterproof material onto itself and stitching along one side edge thereof and thereafter inverting the cylindrical sleeve in a known manner. Next, the end portions of the sleeve 20 are rolled back onto themselves and sewn along the stitch lines 22 to form drawstring passages 24 wherein drawstrings 25 are installed as shown.

The drawstrings 25 are each provided with a spring-actuated locking device 27 which slidingly engages the drawstrings. Since spring actuated locking devices of this type are well known to those skilled in the art, further detailed discussion of the same is not deemed necessary.

In practical use, the protective cover 10 is initially drawn over the handle portion 16 of the fishing rod 14 and over the reel 12 to a point slightly above it on the rod 14 as shown in FIG. 1. Thereafter, the uppermost drawstring 25 is withdrawn from the passage 22 and the associated end opening in the sleeve 20 cinched tightly about the rod 14. The uppermost locking device 27 is then advanced along the drawstring until it contacts the sleeve 20 and is secured.

Next, the lowermost drawstring 25 is secured in a similar manner and the locking device 27 cinched tight.

In this position the protective cover 10 functions to protect the reel and attached fishing line from exposure to the elements and UV radiation.

It will be appreciated by those skilled in the art that when the rod-mounted reel is to be stored vertically in a rod holder 18 as shown in FIG. 1., it may be desirable to draw the lowermost end of sleeve 20 downwardly and over the opening of the rod holder 18 to prevent the accumulation of moisture in the rod holder which might damage the handle portion 16.

For use in conjunction with larger reels, a slot 46 is formed in the sleeve 20 and surrounded by loop material 47. A flap 48 made of the same material as the sleeve 20 includes hook material 49 and is folded as indicated at 50. When a large reel (not shown) is inserted in the sleeve 20, the standard harness lugs 51 can protrude through the slot 46 in the sleeve 20 as clearly seen in FIG. 2. When the reel being used either does not have the harness lug or exposure of the same is not necessary, then the flap 48 can be folded over with the hook material engaging the loop material to close such opening and to prevent any contamination to the interior of the reel jacket.

The jacket of the present invention can also be used as a storage cover for spare reel by placing such jacket over the reel and tightly cinching down both drawstrings to form a reel-protecting pouch. In addition to the storing of extra reels, various and sundry other unmounted items can be stored in and protected from dust, spray and the like by cinching the two end strings. When it is desired to remove such item, one of the drawstrings is simply opened and the items removed.

Finally, various and sundry mounted items such as radios, depth sounders, navigational equipment, and the like can be protected by tightly cinching it closed at one end of the jacket of the present invention and sliding the other open end over the item and then cinching the drawstring tightly around the base or lower portion of the item.

From the above it can be seen that the combination protective cover of the present invention provides a simple yet effective means for protecting rod-mounted reels, as well as loose items from exposure to the weather, UV radiation, and other contaminants.

The terms "upper", "lower", "side", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. A reel cover for protecting a fishing reel carried at one end of a fishing pole, the reel having spaced harness lugs projecting outwardly thereof, said cover comprising: a cylindrical reel cover sleeve formed of a light weight, water repellent material having a cylindrical upper end and a cylindrical lower end and defining a pocket for slidably receiving said reel therewithin when received over the one end of the fishing pole; a peripheral pocket formed at said upper end and at said lower end; a pair of laterally spaced longitudinally extending slots formed in said body for receiving harness lugs on said reel; a drawstring carried in each of said pockets having outwardly extending free ends; and a lock member slidably carried on said free ends of said drawstring in each of said pockets for engaging said cylindrical body to releasably clamp said upper and lower ends against said fishing pole with said reel retained therebetween thereby protecting said reel against adverse weather conditions.

2. A fishing rod and reel assembly in combination with a reel cover, the combination comprising:

an elongated fishing pole;

a reel connected to said fishing pole adjacent one end thereof and projecting laterally outwardly therefrom;

a reel cover having an open ended cylindrical body with upper and lower ends which is slidably received over said fishing pole and said reel, said cylindrical body having reversely turned end portions defining elongated peripheral pockets at each end of said cylindrical body;

drawstrings carried in each of said peripheral pockets having string ends extending outwardly therefrom; and locking means slidably carried on said string ends for engaging said cylindrical body and for releasably clamping said end portions against said fishing pole with said reel retained therebetween thereby protecting said reel against adverse weather conditions.

3. The combination as recited in claim 2 including a pair of laterally spaced longitudinally extending slots formed in said body for receiving projecting harness lugs on said reel.

4. The combination as recited in claim 3 including cover flaps carried on said body for overlying said slots in a closed position; and connecting means between said flaps and said body for maintaining said flaps in said closed position.

5. The combination as recited in claim 4 wherein said connecting means comprises hook and loop fasteners.

* * * * *